United States Patent [19]

Cybulski et al.

[11] Patent Number: 4,460,068
[45] Date of Patent: Jul. 17, 1984

[54] DISC BRAKE AND POSITIONING DEVICE THEREFOR

[75] Inventors: Mark J. Cybulski, Chicago, Ill.; Larry A. Portolese, Granger, Ind.

[73] Assignee: The Bendix Corporation, Southfield, Mich.

[21] Appl. No.: 435,811

[22] Filed: Oct. 21, 1982

Related U.S. Application Data

[63] Continuation of Ser. No. 210,939, Nov. 28, 1980, abandoned.

[51] Int. Cl.³ .............................................. F16D 65/52
[52] U.S. Cl. ...................................... 188/71.8; 92/28; 188/196 P; 192/111 A
[58] Field of Search .................. 188/79.5 GE, 196 A, 188/196 P, 196 R, 198, 199, 71.8; 192/111 A; 92/28

[56] References Cited

U.S. PATENT DOCUMENTS

| | | | |
|---|---|---|---|
| 2,259,815 | 10/1941 | Greve | 92/28 X |
| 2,867,194 | 1/1959 | Jensen | 92/28 X |
| 2,888,104 | 5/1959 | Frayer | 188/196 P X |
| 3,115,220 | 12/1963 | Cagle | 188/196 P |
| 3,186,521 | 6/1965 | Chouings | 188/196 P |
| 3,277,983 | 10/1966 | Jeffries | 188/196 P |
| 3,312,317 | 4/1967 | Hawley et al. | 188/196 P |
| 3,371,750 | 5/1968 | Schutte et al. | 188/196 P X |
| 3,467,226 | 9/1969 | Belart | 188/196 P |

FOREIGN PATENT DOCUMENTS

| | | | |
|---|---|---|---|
| 490856 | 2/1953 | Canada | 188/198 |
| 1393483 | 2/1965 | France | 188/196 P |

*Primary Examiner*—George E. A. Halvosa
*Attorney, Agent, or Firm*—Paul David Schoenle; Ken C. Decker

[57] ABSTRACT

A disc brake includes a positioning device (40) which is pressure responsive to control the amount of retraction for a piston (22) within the disc brake. The positioning device includes a plug (44) movably and sealingly carried within the piston (22) and a pair of legs (48, 50). The plug (44) cooperates with the pair of legs (48, 50) to move the latter to a position in spaced relation to a caliper housing (12) when the pressure level within a pressure chamber (28) is above a predetermined value. A spring (52) cooperates with the plug (44) and the pair of legs (48, 50) to engage the latter with the caliper housing (12) when the fluid pressure within the pressure chamber (28) is below the predetermined value.

3 Claims, 2 Drawing Figures

DISC BRAKE AND POSITIONING DEVICE THEREFOR

This is a continuation of application Ser. No. 210,939, filed Nov. 28, 1980, now abandoned.

The present invention relates to a disc brake assembly wherein a caliper housing defines a bore for receiving a piston and the piston is movable during a brake application to urge one friction pad into engagement with a rotor to be braked. The caliper housing is movable during the brake application to urge another friction pad into engagement with the rotor.

When braking is terminated it is desirable to either maintain a spacing between the friction pads and the rotor or reduce the normal force to a negligible level, so as to eliminate drag on the rotor. In order to maintain a spacing a high retraction seal is generally provided; whereas, reduction of normal force is not a common approach. The high retraction seal is deformable during braking in response to movement of the piston and fluid pressure acting against the seal. Upon termination of braking the fluid pressure is reduced so that the high retraction seal returns to its free state to restrict the piston via the engagement therebetween. The problem with such seal is that the retraction provided by the seal is dependent on a number of dimensional variables (tolerances), and on the amount of travel between the piston and caliper housing, and this travel is affected by caliper housing deflection and shoe and lining compression. If deflection is significant, such as during hard braking, the retraction seal fails to retract the piston and friction pads sufficiently away from the rotor so that drag results. The high retraction seal in view of its elasticity characteristics opposes separation between the friction and the rotor to force the friction pad into dragging engagement with the rotor subsequent to braking. Also, with a high retraction seal it is possible for the piston to retract too far within the housing bore when knock-back occurs or during retraction after a light brake application so that a subsequent brake application will require more fluid displacement than normal. As a result increased pedal travel is required thereby giving a vehicle operator an undesirable feeling of brake failure.

In order to overcome these disadvantages the invention provides a positioning device for the piston which is pressure sensitive rather than travel sensitive and a seal between the piston and the caliper housing which is substantially frictionless. The frictionless seal enables the piston to freely move within the housing bore during termination of braking so that separation between the friction pads and the rotor is not opposed. The frictionless seal comprises a U-cup seal and the position device includes a pressure responsive member which cooperates with at least one leg to engage the one leg with the caliper housing when the pressure within the caliper housing is below a predetermined pressure level. When the pressure level is above the predetermined pressure level, the pressure responsive member maintains the one leg in spaced relation to the caliper housing to permit the piston to move freely within the caliper housing in response to fluid pressure and the "spring-like" deflection of the caliper and friction pads.

More particularly, the positioning device comprises a plug which is sealingly and movably received within a bore on the piston. The plug extends into a pressure chamber to pivotally carry a pair of legs about a pin. A leaf spring is carried on the pin and is engageable with the pair of legs to bias the latter into engagement with the caliper housing when the pressure level within the pressure chamber is below the predetermined value. Above the predetermined value, the plug is movable relative to the piston to cause the pair of legs to separate from the caliper housing. During a brake application, the positioning device moves with the piston within the caliper housing. Upon termination of braking, the pressure decreases in the pressure chamber and the "spring-like" forces of the caliper housing and friction pads bias the piston to retract within the caliper housing. At some time during termination of braking, the pressure level within the pressure chamber reaches the predetermined value so that the leaf spring overcomes the pressure acting across the plug to pivot the pair of legs relative to the pin into engagement with the caliper housing. At the same time that the pair of legs are pivoting into engagement with the caliper housing, the leaf spring is cooperating with the pair of legs to move the plug relative to the piston to return the plug to its original position relative to the piston. The pair of legs include an oversized opening to receive the pin to define clearances therewith and these clearances enable the piston to retract slightly in response to knockback or normal (as opposed to tangential) forces between the rotor and the friction pads, even when the pair of legs initially engage the caliper housing.

It is an advantage of the present invention that the piston is limited in its retraction within the caliper housing so that fluid displacement during a brake application will be kept to a minimum. Also, a substantially frictionless seal is disposed between the piston and caliper housing to seal the pressure chamber therebetween so that the piston is easily movable relative to the caliper housing. Furthermore, the positioning device of the invention is solely pressure sensitive so that random travel of the piston during braking will not affect the operation of the positioning device.

One way of carrying out the invention is described in detail with reference to the accompanying drawings, in which.

Figure 1:
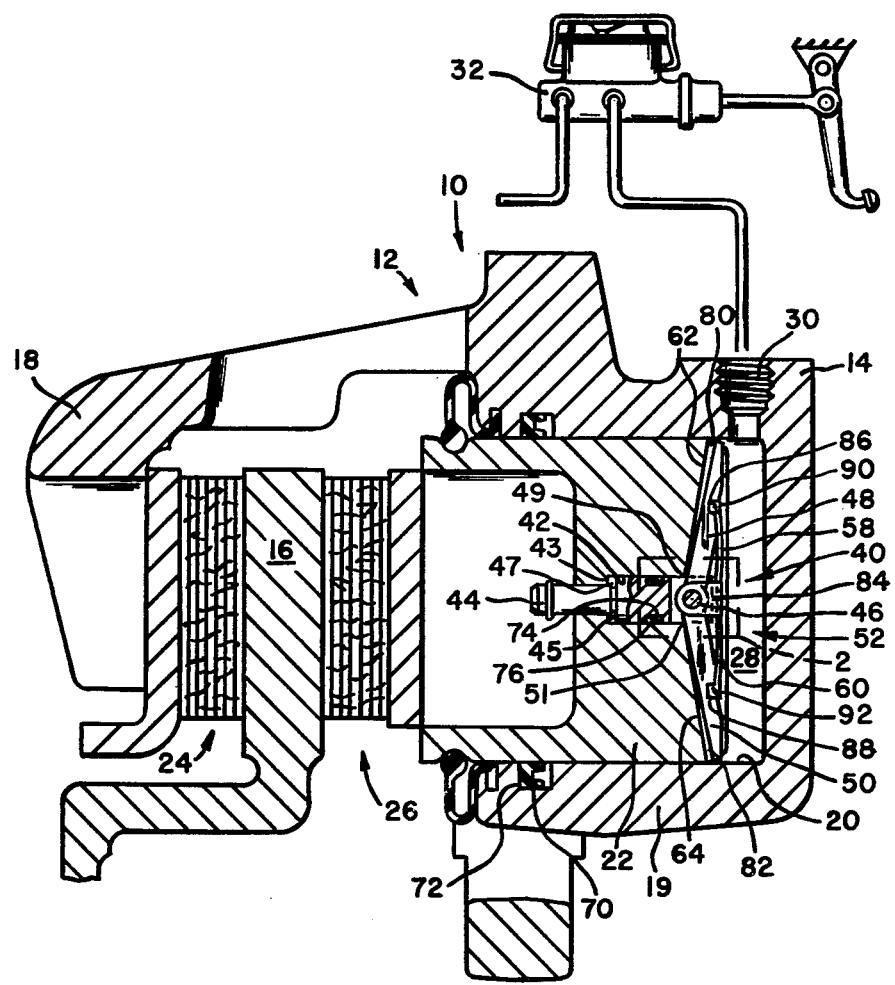
FIG. 1 illustrates a partial cross section of a disc brake assembly constructed in accordance with the teachings of the present invention.

A disc brake assembly 10 includes a caliper housing 12 with a first portion 14 on one side of a rotor 16 to be braked and a second portion 18 on the other side of the rotor 16. The first portion defines a cylinder 19 with a bore 20 for receiving a piston 22. The second portion substantially opposes a friction pad 24 while the piston 22 is engageable with a friction pad 26. As is well known in the art, the caliper housing portion 14 cooperates with the piston 22 to substantially define a pressure chamber 28 for receiving fluid pressure during a brake application. For this purpose an inlet 30 communicates the cylinder 32.

Figure 2:
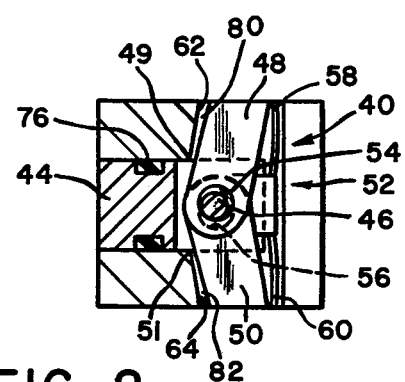
FIG. 2 is an enlarged view of the inscribed portion of FIG. 1.

In accordance with the invention, the piston 22 carries a positioning device 40. The piston includes a stepped bore 42 opening to the pressure chamber 28 and the positioning device 40 includes a plug 44 extending through the stepped bore 42. One end of the plug 44 extends into the pressure chamber 28 and carries a pin 46. The positioning device 40 also includes a pair of legs 48 and 50 and a leaf spring 52. The leaf spring 52 is carried by the pin 46 and the pair of legs define respective oversized openings 54 and 56, see FIG. 2, through which the pin 46 extends. The leaf spring is substantially T-shaped with the middle arms connecting to the pin 46 and one arm 58 engaging leg 48 at the end of arm 58 and another arm 60 engaging leg 50 at the end of arm 60.

The stepped bore defines a shoulder 43 and the plug 44 defines an abutment 45 facing the shoulder. A gap 47 between the shoulder and abutment limits the movement of the plug within the piston toward the rotor.

The end of the piston facing the pressure chamber 28 is provided with slots 62 and 64 tapering toward the rotor as they approach the stepped bore 42. The legs 48 and 50 are shown within respective slots 62 and 64 and engaging the bottom wall of the latter adjacent the stepped bore 42 at edges 49 and 51. The leaf spring 52 is very stiff in the radial direction but relatively weak in the axial direction. Consequently, the leaf spring bows inwardly when it is engaging the legs 48 and 50.

The bore 20 defines a recess 70 for receiving a U-cup seal 72 which imparts substantially less resistance to the piston 22 than a conventional high retraction seal, such as illustrated in U.S. Pat. No. 3,377,076. Therefore, the U-cup seal 72 is referred to as a "frictionless" seal. The plug 44 defines a recess 74 for receiving an O-ring seal 76 which is compressed within the recess 74 by the wall of the stepped bore 42. Consequently, the O-ring seal 76 generates greater frictional resistance to movement between the plug and piston than the U-cup seal generates between the piston and caliper housing.

During a brake application, the master cylinder 32 communicates fluid pressure to the pressure chamber 28. Below a predetermined pressure level, the piston is movable relative to the positioning device 40 and the cylinder 19. Above the predetermined pressure level, the fluid pressure acting across the plug 44 at the O-ring seal 76 overcomes the moment imparted to the pair of legs by the leaf spring 52, so that the plug 44 moves within the stepped bore toward the rotor 16. As a result the pair of legs are pivoted about edges 49 and 51 to contract radially, thereby moving the pair of legs in spaced relation to the caliper housing. The positioning device 40 is movable with the piston 22 so long as the fluid pressure level within the pressure chamber 28 is above the predetermined value.

During braking the caliper housing 12 is subjected to axial forces causing deflection. That is, the fluid pressure within pressure chamber 28 biases the caliper portion 14 to the right viewing FIG. 1 and the rotor 16 opposes movement of the caliper portion 18 toward the right so that the portion 18 has a tendency to deflect or spread away from the caliper portion 14. Also, the friction pads 24 and 26 have "spring-like" characteristics so that during braking the friction pad axial width is slightly less than when the disc brake is at rest.

Upon termination of braking, the fluid pressure initially decreases to a pressure level which is above the predetermined value. During initial termination of braking, the "spring-like" characteristics of the caliper and friction pads create a restoring force to bias the piston to retract within the cylinder 19. This retraction of the piston 22 also carries with it the retracted positioning device 40 because the pressure level within pressure chamber 28 is decreasing but not yet below the predetermined pressure level. When the decreasing pressure level reaches the predetermined pressure level, the moment created by the leaf spring for the pair of legs about the edges 49 and 51 biases the plug via pin 46 to move toward the pressure chamber 28. Movement of the plug 44 relative to the piston 22 permits the leaf spring to bias the pair of legs to pivot about the edges 49 and 51 to radially expand the ends of the pair of legs. Also, the leaf spring biases the pair of legs to move radially outward relative to the pin 46 via the clearance between the pin and the oversized openings. Consequently, the ends of the pair of legs are brought into engagement with the wall of bore 20 to oppose further movement of the plug relative to the piston. When the pair of legs are engaging the wall of bore 20, each leg defines a spacing 80 and 82 which increases in dimension from the respective edges 49 and 51 to the ends of the legs. Moreover, when the pair of legs are engaging the wall of bore 20, the pin 46 is disposed to one side of each oversized opening remote from that end of the leg engaging the wall of bore 20. Therefore, if the piston is subjected to further forces biasing the piston inwardly, such as with runout or vibration of the rotor, the piston will be movable slightly to take up the clearances 80 and 82 and the ends of the legs will remain engaged with the wall of bore 20. With this latter movement, the legs will be pivoted about their point of contact of the wall of bore 20 and the pin 46 will take a new position within the oversized openings to the other side.

The leaf spring 52 defines a U-shaped center section 84 for connecting with the pin 46 and also defines U-shaped extremities 86 and 88 for connecting with the respective legs 48 and 50. Each leg is provided with an undercut recess 90 and 92 to receive the U-shaped extremities 86 and 88, respectively.

In view of the operation of the positioning device 40 wherein the retraction of the disc brake piston is limited by the fluid pressure level within the disc brake, it is possible to use a substantially "frictionless" U-cup seal 72 which eliminates loading the piston in the direction of the rotor.

We claim:

1. In a disc brake, a housing defining a bore for receiving a piston, at least one friction pad cooperating with the piston to move to a braking position during a brake application, the piston cooperating with the housing to substantially define a pressure chamber for receiving fluid pressure during the brake application, and means cooperating with the piston and the housing to limit retraction of the piston within the bore upon termination of braking, characterized by said means comprising a pressure responsive assembly carried by said piston, said pressure responsive assembly normally engaging said housing after termination of braking to establish a rest position for said piston, said pressure responsive assembly being operable solely in response to the fluid pressure within the pressure chamber reaching a predetermined value during the brake application to positively separate said means completely from said housing even if said piston fails to move during braking, said pressure responsive assembly being engageable with said housing during termination of braking when the fluid pressure within the pressure chamber is below the predetermined value to reestablish the rest position, said pressure responsive assembly including at least one leg engageable with said housing and a plug sealingly and movably engaging said piston, said plug being movable relative to said piston in response to the fluid pressure reaching the predetermined value to disengage said one leg from said housing, said pressure responsive assembly including a resilient member biasing said one leg into engagement with said housing and a pin connects said one leg and said resilient member with said plug, said one leg defining an oversized opening to receive said pin and said one leg is movable relative to said pin to move the latter from one side of said oversized opening to the other side.

2. The disc brake of claim 1 further characterized by said resilient member comprising a leaf spring having greater restoring force in a radial direction than in an axial direction.

3. The disc brake of claim 1 characterized by said leg being operatively coupled to said plug to pivot relative to said piston when said plug is moved relative to said piston.

* * * * *